United States Patent
Wang

(10) Patent No.: US 11,012,620 B2
(45) Date of Patent: May 18, 2021

(54) PANORAMIC IMAGE GENERATION METHOD AND DEVICE

(71) Applicant: HANGZHOU HIKVISION DIGITAL TECHNOLOGY CO., LTD., Hangzhou (CN)

(72) Inventor: Zewen Wang, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/635,763

(22) PCT Filed: Aug. 3, 2018

(86) PCT No.: PCT/CN2018/098634
§ 371 (c)(1),
(2) Date: Jan. 31, 2020

(87) PCT Pub. No.: WO2019/024935
PCT Pub. Date: Feb. 7, 2019

(65) Prior Publication Data
US 2020/0366838 A1 Nov. 19, 2020

(30) Foreign Application Priority Data
Aug. 3, 2017 (CN) .......................... 201710655999.7

(51) Int. Cl.
*H04N 5/232* (2006.01)
*H04N 13/111* (2018.01)
*G06T 5/00* (2006.01)

(52) U.S. Cl.
CPC ......... *H04N 5/23238* (2013.01); *G06T 5/006* (2013.01); *H04N 13/111* (2018.05)

(58) Field of Classification Search
CPC ... H04N 5/23238; H04N 13/111; G06T 5/006
See application file for complete search history.

(56) References Cited

U.S. PATENT DOCUMENTS 10,733,786 B2 * 8/2020 Briggs .................... G06T 15/06
2005/0104966 A1   5/2005 Schoelkopf et al.
(Continued)

FOREIGN PATENT DOCUMENTS

| CN | 105245838 | 1/1916 |
|---|---|---|
| CN | 105913478 | 8/1916 |

(Continued)

OTHER PUBLICATIONS

Extended European Search Report issued in Corresponding Application No. 18841194.6, dated Apr. 14, 2020.

(Continued)

*Primary Examiner* — James T Boylan
(74) *Attorney, Agent, or Firm* — Norton Rose Fulbright US LLP

(57) ABSTRACT

Embodiments of the present application provide a method and apparatus for generating a panoramic image. The method includes: determining, according to a pre-established mapping relationship, a pixel point in the two-dimensional planar image to which each of grid points in a preset stereoscopic model is mapped, wherein multiple grid points form one grid plane and accordingly, multiple pixel points to which the multiple grid points are mapped form one pixel region; and rendering each of the grid planes by the pixel region corresponding to this grid plane, to obtain a panoramic image. In the solution of the present application, it is not necessary to generate a distortion-corrected image and an overhead image, thereby saving storage resources.

15 Claims, 5 Drawing Sheets

(56) References Cited

U.S. PATENT DOCUMENTS

| | | | |
|---|---|---|---|
| 2009/0322878 A1 | 12/2009 | Ishii | |
| 2010/0246901 A1 | 9/2010 | Yang | |
| 2011/0026771 A1 | 2/2011 | Hsu et al. | |
| 2012/0140073 A1 | 6/2012 | Ohta et al. | |
| 2015/0358613 A1* | 12/2015 | Sandrew | H04N 13/261 |
| | | | 348/36 |
| 2016/0335792 A1* | 11/2016 | Forutanpour | G06T 19/00 |

FOREIGN PATENT DOCUMENTS

| | | | | |
|---|---|---|---|---|
| CN | 105959675 | | 9/1916 | |
| CN | 106101635 | | 11/1916 | |
| CN | 106131535 | | 11/1916 | |
| CN | 106530218 | | 3/1917 | |
| CN | 106570822 | | 4/1917 | |
| CN | 106815805 | | 6/1917 | |
| CN | 102750734 | | 10/2012 | |
| CN | 105163158 | | 12/2015 | |
| CN | 105245838 | * | 1/2016 | H04N 13/04 |
| WO | WO 2014043814 | | 3/2014 | |

OTHER PUBLICATIONS

International Search Report and Written Opinion issued in corresponding PCT Application No. PCT/CN2018/098634, dated Oct. 24, 2018 (English translation of International Search Report provided).

* cited by examiner

PANORAMIC IMAGE GENERATION METHOD AND DEVICE

CROSS-REFERENCE TO RELATED APPLICATIONS

The present application is a national phase under 35 U.S.C. § 371 of International Application No. PCT/CN2018/098634, filed Aug. 3, 2018, which claims priority to Chinese patent application No. 201710655999.7 filed with the China National Intellectual Property Administration on Aug. 3, 2017 and entitled "Method and Apparatus for Generating A Panoramic Image", each of which are incorporated herein by reference in their entirety.

TECHNICAL FIELD

The present application relates to the field of image processing technology, and in particular, to a method and apparatus for generating a panoramic image.

BACKGROUND

At present, panoramic images are very valuable and offer huge advantages in many fields. For example, in the vehicle field, it is possible to provide 360-degree panoramic images around a vehicle for drivers, to enable the drivers to perceive the surrounding environment more clearly, thereby improving driving safety.

An existing method for generating a panoramic image generally includes: capturing a two-dimensional planar image; performing distortion correction on the two-dimensional planar image to obtain a distortion-corrected image; transforming the distortion-corrected image into an overhead image through overhead viewpoint transformation; and performing texture mapping on the overhead image in a preset stereoscopic model to obtain a panoramic image.

In the above method, it is necessary to generate the distortion-corrected image and the overhead image, which occupy large quantities of storage resources.

SUMMARY

The objective of the embodiments of the present application is to provide a method and apparatus for generating a panoramic image, to save storage resources.

In order to achieve the above objective, an embodiment of the present application discloses a method for generating a panoramic image, including:

acquiring a two-dimensional planar image;

determining, according to a pre-established mapping relationship, a pixel point in the two-dimensional planar image to which each of grid points in a preset stereoscopic model is mapped, wherein the mapping relationship includes a corresponding relationship between each of the grid points in the preset stereoscopic model and a pixel point in the two-dimensional planar image;

for each of grid planes in the preset stereoscopic model, determining a pixel region formed by pixel points to which grid points in this grid plane are mapped as a pixel region corresponding to this grid plane, wherein one grid plane is formed by a first preset number of grid points; and rendering each of the grid planes by the pixel region corresponding to this grid plane, to obtain a panoramic image.

Optionally, the mapping relationship may be established by:

determining grid points in the preset stereoscopic model;

for each of the determined grid points, determining a projection line between the grid point and a preset projection point, wherein the projection point is located above an overhead plane of the preset stereoscopic model, and the projection line starts from the projection point and passes through the grid point;

determining intersection points of the projection lines and the overhead plane;

converting the intersection points into overhead pixel points;

performing inverse perspective transformation on the overhead pixel points based on external parameters of a camera capturing the two-dimensional planar image, to obtain distortion-corrected pixel points;

performing an inverse distortion correction operation on the distortion-corrected pixel points based on internal parameters of the camera to obtain two-dimensional planar pixel points; and establishing the mapping relationship based on each of the grid points and a two-dimensional planar pixel point corresponding to this grid point.

Optionally, the step of converting the intersection points into overhead pixel points may include:

converting the intersection points into the overhead pixel points by a preset conversion coefficient.

Optionally, the step of determining grid points in the preset stereoscopic model may include:

dividing the preset stereoscopic model by latitude and longitude; and determining, based on a divided result, each of the grid points in the model, longitude and latitude values of each of the grid points, and three-dimensional coordinates of each of the grid points in the preset stereoscopic model;

the step of establishing the mapping relationship based on each of the grid points and a two-dimensional planar pixel point corresponding to this grid point may include:

for each of the grid points, establishing a mapping relationship between the three-dimensional coordinates of the grid point and pixel coordinates of a two-dimensional planar pixel point corresponding to the grid point by taking the longitude and latitude values of the grid point as an index;

the step of determining, according to a pre-established mapping relationship, a pixel point in the two-dimensional planar image to which each of grid points in a preset stereoscopic model is mapped may include:

sequentially determining current to-be-mapped grid points based on the indexes;

for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped; and the step of rendering each of the grid planes by the pixel region corresponding to this grid plane, to obtain a panoramic image may include:

taking each of the grid planes as a to-be-rendered plane;

determining to-be-rendered positions in the preset stereoscopic model based on three-dimensional coordinates of grid points contained in the to-be-rendered planes;

determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

Optionally, the step of dividing the preset stereoscopic model by latitude and longitude may include:

determining a latitude interval of each of viewpoints for the preset stereoscopic model;

calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

Optionally, the mapping relationship may be established by:

performing a distortion correction operation on pixel points in a two-dimensional planar image sample based on internal parameters of a camera capturing the two-dimensional planar image, to obtain distortion-corrected pixel points;

performing perspective transformation on the distortion-corrected pixel points based on external parameters of the camera, to obtain overhead pixel points;

converting the overhead pixel points into world coordinate points;

determining projection lines between the world coordinate points and a preset projection point of the preset stereoscopic model;

determining intersection points of the projection lines and the preset stereoscopic model as grid points; and establishing the mapping relationship based on each of the grid points and a pixel point in the two-dimensional planar image sample corresponding to this grid point.

Optionally, after determining, according to the pre-established mapping relationship, the pixel point in the two-dimensional planar image to which each of grid points in the preset stereoscopic model is mapped, the method may further include:

marking a grid point that has failed to be mapped as an invalid point;

the step of, for each of grid planes in the preset stereoscopic model, determining a pixel region formed by pixel points to which grid points in this grid plane are mapped as a pixel region corresponding to this grid plane may include:

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point; and the step of rendering each of the grid planes by the pixel region corresponding to this grid plane to obtain a panoramic image includes:

rendering each of the valid grid planes by the pixel region corresponding to the valid grid plane to obtain the panoramic image.

Optionally, the step of acquiring a two two-dimensional planar image may include:

acquiring two-dimensional planar images at multiple viewpoints;

the step of determining, according to a pre-established mapping relationship, a pixel point in the two-dimensional planar image to which each of grid points in a preset stereoscopic model is mapped includes:

determining a current viewpoint and target grid points of the preset stereoscopic model at the current viewpoint;

determining, according to the pre-established mapping relationship, a pixel point in the two-dimensional planar image to which each of the target grid points is mapped;

the step of, for each of grid planes in the preset stereoscopic model, determining a pixel region formed by pixel points to which grid points in this grid plane are mapped as a pixel region corresponding to this grid plane may include:

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points;

the step of rendering each of the grid planes by the pixel region corresponding to this grid plane to obtain a panoramic image may include:

rendering each of the target grid planes by the target pixel region corresponding to the target grid plane to obtain a panoramic image at the current viewpoint.

To achieve the above objective, an embodiment of the present application further discloses an apparatus for generating a panoramic image, including:

an acquiring module, configured for acquiring a two-dimensional planar image;

a first determining module, configured for determining, according to a pre-established mapping relationship, a pixel point in the two-dimensional planar image to which each of grid points in a preset stereoscopic model is mapped, wherein the mapping relationship includes a corresponding relationship between each of the grid points in the preset stereoscopic model and a pixel point in the two-dimensional planar image;

a second determining module, configured for determining, for each of grid planes in the preset stereoscopic model, a pixel region formed by pixel points to which grid points in this grid plane are mapped as a pixel region corresponding to this grid plane, wherein one grid plane is formed by a first preset number of grid points; and a rendering module, configured for rendering each of the grid planes by the pixel region corresponding to this grid plane, to obtain a panoramic image.

Optionally, the apparatus may further include:

a third determining module, configured for determining grid points in the preset stereoscopic model;

a fourth determining module, configured for determining, for each of the determined grid points, a projection line between the grid point and a preset projection point, wherein the projection point is located above an overhead plane of the preset stereoscopic model, and the projection line starts from the projection point and passes through the grid point;

a fifth determining module, configured for determining intersection points of the projection lines and the overhead plane;

a first converting module, configured for converting the intersection points into overhead pixel points;

an inverse transformation module, configured for performing inverse perspective transformation on the overhead pixel points based on external parameters of a camera capturing the two-dimensional planar image, to obtain distortion-corrected pixel points;

an inverse operation module, configured for performing an inverse distortion correction operation on the distortion-corrected pixel points based on internal parameters of the camera to obtain two-dimensional planar pixel points; and a first establishing module, configured for establishing the mapping relationship based on each of the grid points and a two-dimensional planar pixel point corresponding to this grid point.

Optionally, the first converting module is further configured for converting the intersection points into the overhead pixel points by a preset conversion coefficient.

Optionally, the third determining module may include:

a dividing sub-module, configured for dividing the preset stereoscopic model by latitude and longitude; and a determining sub-module, configured for determining, based on a divided result, each of the grid points in the model, longitude and latitude values of each of the grid points, and three-dimensional coordinates of each of the grid points in the preset stereoscopic model;

the first establishing module may be further configured for:

for each of the grid points, establishing a mapping relationship between the three-dimensional coordinates of the grid point and pixel coordinates of a two-dimensional planar pixel point corresponding to the grid point by taking the longitude and latitude values of the grid point as an index;

the first determining module may be further configured for:

sequentially determining current to-be-mapped grid points based on the indexes; and for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped;

the rendering module may be further configured for:

taking each of the grid planes as a to-be-rendered plane; determining to-be-rendered positions in the preset stereoscopic model based on three-dimensional coordinates of grid points contained in the to-be-rendered planes; determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

Optionally, the dividing sub-module may be further configured for:

determining a latitude interval of each of viewpoints for the preset stereoscopic model;

calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

Optionally, the apparatus may further include:

a distortion correction operation module, configured for performing a distortion correction operation on pixel points in a two-dimensional planar image sample based on internal parameters of a camera capturing the two-dimensional planar image, to obtain distortion-corrected pixel points;

a perspective transformation module, configured for performing perspective transformation on the distortion-corrected pixel points based on external parameters of the camera, to obtain overhead pixel points;

a second converting module, configured for converting the overhead pixel points into world coordinate points;

a sixth determining module, configured for determining projection lines between the world coordinate points and a preset projection point of the preset stereoscopicscopic model;

a seventh determining module, configured for determining intersection points of the projection lines and the preset stereoscopic model as grid points; and a second establishing module, configured for establishing the mapping relationship based on each of the grid points and a pixel point in the two-dimensional planar image sample corresponding to this grid point.

Optionally, the apparatus may further include:

a marking module, configured for marking a grid point that has failed to be mapped as an invalid point;

the second determining module may be further configured for:

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point;

the rendering module may be further configured for:

rendering each of the valid grid planes by the pixel region corresponding to the valid grid plane to obtain the panoramic image.

Optionally, in the apparatus, the acquiring module may be further configured for acquiring two-dimensional planar images at multiple viewpoints;

the first determining module may be further configured for:

determining a current viewpoint and target grid points of the preset stereoscopic model at the current viewpoint; and determining, according to the pre-established mapping relationship, a pixel point in the two-dimensional planar image to which each of the target grid points is mapped;

the second determining module may be further configured for:

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points;

the rendering module may be further configured for:

rendering each of the target grid planes by the target pixel region corresponding to the target grid plane to obtain a panoramic image at the current viewpoint.

To achieve the above objective, an embodiment of the present application further discloses an electronic device, including a processor, a communication interface, a memory, and a communication bus, wherein the processor, the communication interface, and the memory communicate with each other through the communication bus, the memory is configured to store a computer program;

the processor is configured to implement any one of the foregoing methods for generating a panoramic image when executing the program stored in the memory.

To achieve the above objective, an embodiment of the present application further discloses a computer-readable storage medium, the computer-readable storage medium stores a computer program which is executed by a processor, so as to cause the processor to perform any one of the foregoing methods for generating a panoramic image.

To achieve the above objective, an embodiment of the present application further discloses executable program codes which, when executed, implement any one of the foregoing methods for generating a panoramic image.

With the embodiment shown of the present application, a pixel point in a two-dimensional planar image to which each of grid points in a preset stereoscopic model is mapped is determined according to a pre-established mapping relationship. Multiple grid points form one grid plane, and accordingly, multiple pixel points to which the multiple grid points are mapped form one pixel region. Each of the grid planes is rendered by the pixel region corresponding to the grid plane to obtain a panoramic image. It can be seen that in this solution, it is not necessary to generate a distortion-corrected image and an overhead image, thus saving storage resources.

Of course, any product or method of this application does not necessarily achieve all the advantages described above at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

In order to solve the above technical problems, embodiments of the present application provide a method and an apparatus for generating a panoramic image. The method and apparatus can be applied to various devices with image processing functions, which are not specified herein.

A method for generating a panoramic image according to an embodiment of the present application is described in detail below.

Figure 1:
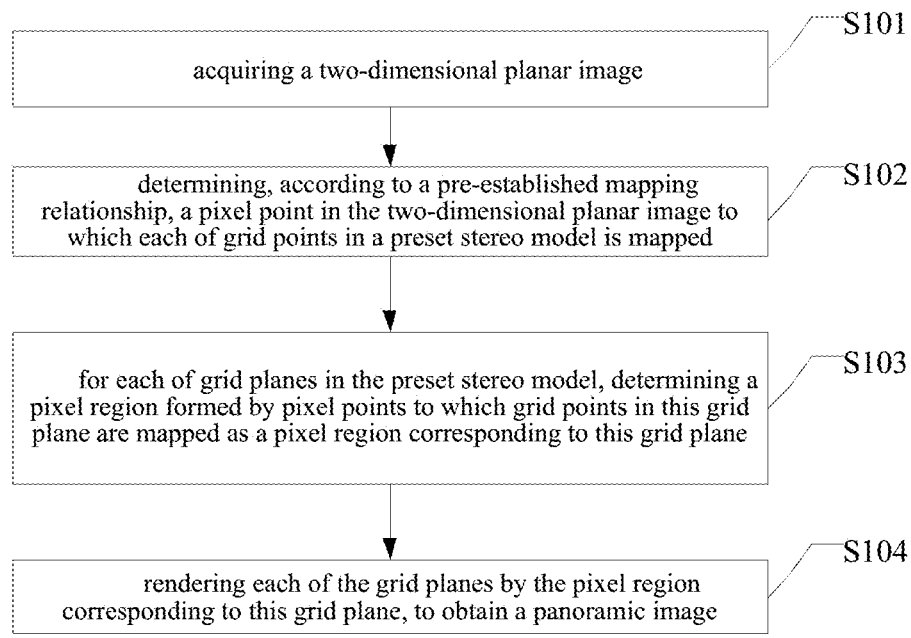
FIG. 1 is a first flowchart of a method for generating a panoramic image according to an embodiment of the present application.

FIG. 1 is a first flowchart of a method for generating a panoramic image according to an embodiment of the present application. The method includes:

S101: acquiring a two-dimensional planar image;

S102: determining, according to a pre-established mapping relationship, a pixel point in the two-dimensional planar image to which each of grid points in a preset stereoscopic model is mapped; wherein the mapping relationship includes a corresponding relationship between each of the grid points in the preset stereoscopic model and a pixel point in the two-dimensional planar image;

S103: for each of grid planes in the preset stereoscopic model, determining a pixel region formed by pixel points to which grid points in the grid plane are mapped, as a pixel region corresponding to the grid plane; wherein one grid plane is formed by a first preset number of grid points; and S104: rendering each of the grid planes by the pixel region corresponding to the grid plane, to obtain a panoramic image.

In the embodiment shown in FIG. 1 of the present application, the pixel point in the two-dimensional planar image to which each of the grid points in the preset stereoscopic model is mapped is determined according to the pre-established mapping relationship. Multiple grid points form one grid plane, and thus multiple pixel points to which the multiple grid points are mapped form one pixel region. Each of the grid planes is rendered by the pixel region corresponding to the grid plane to obtain the panoramic image. It can be seen that in this method, it is not necessary to generate a distortion-corrected image and an overhead image, thereby saving storage resources.

The embodiment shown in FIG. 1 is described in detail below.

S101: acquiring a two-dimensional planar image.

As an implementation, an executing subject (a device that executes this method, hereinafter referred to as the device) may have an image capture function, and the two-dimensional planar image acquired in S101 may be captured by the device. As another implementation, the device may also be communicatively connected with other cameras, and acquire two-dimensional planar images captured by other cameras.

The acquired two-dimensional planar image may include one or multiple images. If the acquired two-dimensional planar image includes multiple images, the images may be images at respective viewpoints in a same scene. The two-dimensional planar image may also be one frame image in one video or multiple frame images in multiple videos, which is not specifically limited.

S102: determining, according to a pre-established mapping relationship, a pixel point in the two-dimensional planar image to which each of grid points in a preset stereoscopic model is mapped; wherein the mapping relationship includes a corresponding relationship between each of the grid points in the preset stereoscopic model and a pixel point in the two-dimensional planar image.

This embodiment provides two ways to establish a mapping relationship, including a way to establish a mapping relationship in a reverse direction and a way to establish a mapping relationship in a forward direction.

The way to establish a mapping relationship in a reverse direction includes:

determining grid points in the preset stereoscopic model;

for each determined grid point, determining a projection line between this grid point and a preset projection point, wherein the projection point is located above an overhead plane of the preset stereoscopic model, and the projection line starts from the projection point and passes through this grid point;

determining intersection points of the projection lines and the overhead plane;

converting the intersection points into overhead pixel points;

performing inverse perspective transformation on the overhead pixel points based on external parameters of a camera capturing the two-dimensional planar image, to obtain distortion-corrected pixel points;

performing an inverse distortion correction operation on the distortion-corrected pixel points based on internal parameters of the camera to obtain two-dimensional planar pixel points; and establishing the mapping relationship between each of the grid points and a two-dimensional planar pixel point corresponding to this grid point.

Figure 2:
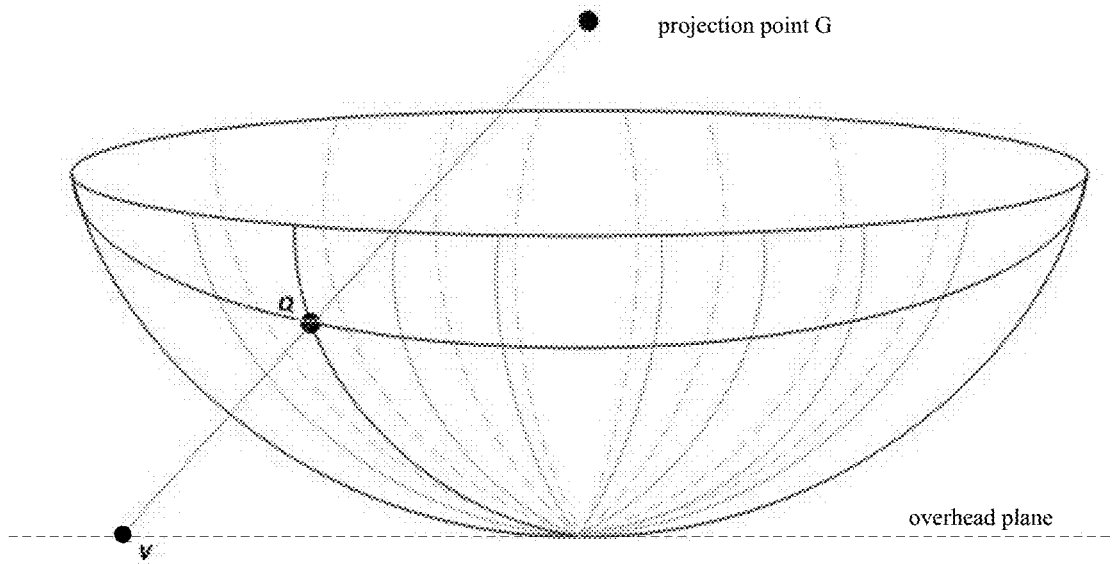
FIG. 2 is a diagram of a stereoscopic model according to an embodiment of the present application.

Referring to FIG. 2, the preset stereoscopic model is a partial sphere in FIG. 2, and a horizontal plane tangent to the partial sphere is the overhead plane of the preset stereoscopic model. The projection point may be located at the center of the partial sphere or in a vertical line between the center of the sphere and the overhead plane, and the projection point is located above the overhead plane.

Point Q is a grid point in the preset stereoscopic model. A projection line between the point Q and projection point G is determined, which intersects with the overhead plane at point V.

The intersection point V is converted into an overhead pixel point. In an optional implementation of the present application, the intersection point may be converted into an overhead pixel point by a preset conversion coefficient. The conversion coefficient may be understood as a conversion coefficient for converting a point in the world coordinate system into a pixel point in the overhead image. It should be noted that, in this embodiment, the overhead image is not generated, but the above intersection point is converted by using the conversion coefficient.

In this implementation, a coordinate system in which the stereoscopic model in FIG. 2 is located may be the world coordinate system, or the coordinate system may be a further coordinate system, and a conversion relationship between the further coordinate system and the world coordinate system is established. These are reasonable.

Assume that three-dimensional coordinates of the point Q in the world coordinate system are $(q_x, q_y, q_z)$, and coordinates of the point V in the world coordinate system are $(V_x, V_y)$, wherein a coordinate Vz of the point V in the Z axis may not be considered here.

Assume that the conversion coefficient is k, the intersection point V is converted to the overhead pixel point v, and pixel coordinates of the pixel point v are $(v_x, v_y)$. Then, the overhead pixel point is obtained by $v_x=k*V_x$, $v_y=k*V_y$, which can be understood as a pixel point in the overhead image. It should be noted that, in this embodiment, the overhead image is not actually generated, but the pixel point to which the intersection point of the projection line and the overhead plane is converted is referred to as the overhead pixel point in the process of establishing the mapping relationship, for convenience of description.

The inverse perspective transformation is performed on the overhead pixel point according to the external parameters of the camera capturing the two-dimensional planar image in S101, to obtain the distortion-corrected pixel point. The distortion-corrected pixel point may be understood as pixel points in a distortion-corrected image. It should be noted that, in this embodiment, the distortion-corrected image is not actually generated, but the pixel point obtained through the inverse perspective transformation is referred to as a distortion-corrected pixel point in the process of establishing the mapping relationship, for convenience of description.

The inverse distortion correction operation is performed on the distortion-corrected pixel point according to the internal parameters of the camera capturing the two-dimensional planar image in S101, to obtain the two-dimensional planar pixel point. The two-dimensional planar pixel point is a pixel point in the two-dimensional planar image to which the grid point Q is mapped, that is, a two-dimensional planar pixel point corresponding to the grid point Q. It is assumed herein that the pixel coordinates of the two-dimensional planar pixel point are $(p_x, p_y)$.

In this way, the two-dimensional planar pixel point corresponding to each of grid points in the stereoscopic model in FIG. 2 can be determined. As such, a mapping relationship can be established, which includes a corresponding relationship between each of the grid points in the stereoscopic model and a pixel point in the two-dimensional planar image, including a corresponding relationship between $(q_x, q_y, q_z)$ and $(p_x, p_y)$.

As an implementation, in the process of establishing the mapping relationship in the reverse direction, the preset stereoscopic model is first divided by latitude and longitude, and then each grid point in the model, longitude and latitude values of each grid point, and three-dimensional coordinates of each grid point in the preset stereoscopic model may be determined according to a divided result. In this way, the established mapping relationship includes longitude and latitude values of a grid point, three-dimensional coordinates of the grid point, and pixel coordinates of a two-dimensional planar pixel point corresponding to the grid point. Specifically, the mapping relationship may be established by taking longitude and latitude values of a grid point as an index.

It can be understood that the shape and position of the preset stereoscopic model in the coordinate system are preset. Referring still to FIG. 2, by setting the coordinates of the center of the partial sphere, the radius of the partial sphere, and the height of the partial sphere (the vertical distance from the overhead plane to the highest edge of the sphere), the shape and position of the sphere are set. As such, the three-dimensional coordinates of each grid point on a surface of the model can be further determined. In addition, by dividing the surface of the model by latitude and longitude, the longitude and latitude values of each grid point can be determined.

In this embodiment, S102 may include sequentially determining current to-be-mapped grid points based on the indexes; and for each current to-be-mapped grid point, determining three-dimensional coordinates of the current to-be-mapped grid point and its corresponding pixel coordinates, wherein the determined pixel coordinates are coordinates of a pixel point in the two-dimensional planar image to which the current to-be-mapped grid point is mapped.

Assume that the longitude value and the latitude value of the grid point Q in FIG. 2 are i and j, respectively, and the established mapping relationship includes a corresponding relationship among (i, j), $(q_x, q_y, q_z)$ and $(p_x, p_y)$, wherein (i, j) can be used as an index. In this way, in S102, current to-be-mapped grid points can be determined in order of latitudes and longitudes of grid points, and three-dimensional coordinates of the current to-be-mapped grid points and their corresponding pixel coordinates are determined to obtain pixel points in the two-dimensional planar image to which the grid points are mapped.

This embodiment can be applied to a sphere model or a sphere-like model, such as the partial sphere model in FIG. 2. In these models, the three-dimensional coordinates of the grid points on the surface of the model are not arranged linearly. It can be understood that in these models, compared with the determination of grid points based on three-dimensional coordinates, the determination of grid points based on latitudes and longitudes can better adjust the distribution of grid points, and can further better adjust the density of grid points.

Furthermore, the density of grid points reflects the resolution of the mapping relationship. The larger the number of grid points and the denser the grid points, the more the established mapping relationships and the greater the resolution. The resolution of the mapping relationship is adjustable here, and is independent of the resolution of the image.

In this implementation, dividing the preset stereoscopic model by latitude and longitude may include determining a latitude interval of each of viewpoints for the preset stereoscopic model; calculating the sum of the latitude intervals of the viewpoints; and subtracting an overlapping latitude interval between the viewpoints from the sum to obtain a latitude interval of the preset stereoscopic model; determining a longitude interval of each of the viewpoints as a longitude interval of the preset stereoscopic model; and dividing the preset stereoscopic model by latitude and longitude based on the longitude interval and the latitude interval of the preset stereoscopic model.

For example, referring to FIG. 2, the model in FIG. 2 reflects a 360-degree view. The two-dimensional planar image acquired in S101 is generally not a 360-degree view image, and thus multiple two-dimensional planar images can be acquired in S101. These multiple images are images at resepctive viewpoints for the stereoscopic model, and can be stitched into a 360-degree view image. Assume that four two-dimensional planar images are acquired in S101, and a viewing angle of each two-dimensional planar image is greater than or equal to 90 degrees. In most scenarios, the above stitching is implemented by a transverse stitching. For example, the partial sphere in FIG. 2 is divided into four parts, each of which corresponds to an image, and the four images are stitched transversely in line with the viewing angle of the sphere.

The transverse stitching can be understood as calculating the sum of the widths of the above four images (wherein their overlapping portions are removed) with unchanged height. The latitude division is performed based on the height of the sphere in FIG. 2, and the longitude division is performed based on the width of a plane obtained by expanding the surface of the sphere in FIG. 2. Therefore, the latitude interval of the partial sphere in FIG. 2 is obtained by subtracting an overlapping portion from the sum of latitude intervals of the four images. Since the four images have the same longitude interval or substantially the same longitude interval, the longitude interval may be directly used as the longitude interval of the partial sphere in FIG. 2. Once the latitude and longitude intervals of the model are determined, the model can be divided by latitude and longitude.

Figure 3:
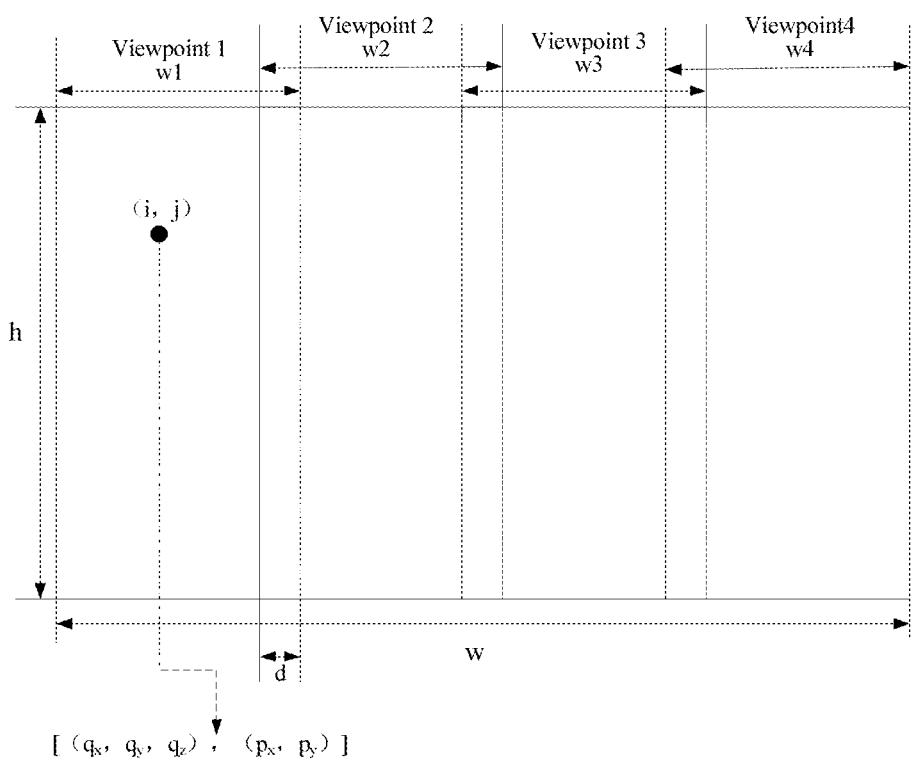
FIG. 3 is a diagram of a storage mode of a mapping relationship according to an embodiment of the present application.

After the mapping relationship is established, it is stored. The storage format of the mapping relationship can be shown in FIG. 3. Latitude intervals of viewpoints (viewpoint 1, viewpoint 2, viewpoint 3, and viewpoint 4) corresponding to the stereoscopic model are w1, w2, w3, and w4, respectively. There are overlapping portions d (three overlapping portions d) between the latitude intervals. The latitude interval of the stereoscopic model is w=w1+w2+w3+w4−3d. The longitude interval of each viewpoint is h, and thus the longitude interval of the stereoscopic model is h. The longitude value and the latitude value of a certain point in FIG. 3 are i and j, respectively, and this position stores three-dimensional coordinates of a grid point and corresponding pixel coordinates, such as [($q_x$, $q_y$, $q_z$), ($p_x$, $p_y$)].

A "viewpoint" may be used to indicate a position of a virtual observer. The "viewpoint" may include information such as a position of a camera and a viewing angle of the camera capturing an image. Each viewpoint in FIG. 3 may correspond to one camera. Compared to some schemes in which each camera corresponds to one mapping table, in this embodiment, multiple cameras correspond to one set of mapping relationship. On one hand, the scheme of the present application saves storage resources, and on the other hand, in order to determine the pixel points to which the grid points are mapped, it is more efficient to search one set of mapping relationship than to search multiple mapping tables.

The way to establish a mapping relationship in a forward direction includes:

performing a distortion correction operation on pixel points in a two-dimensional planar image sample according to internal parameters of a camera capturing the two-dimensional planar image, to obtain distortion-corrected pixel points; performing perspective transformation on the distortion-corrected pixel points according to external parameters of the camera, to obtain overhead pixel points; converting the overhead pixel points into world coordinate points; determining projection lines between the world coordinate points and a preset projection point of a preset stereoscopic model; determining intersection points of the projection lines and the preset stereoscopic models as grid points; and establishing the mapping relationship based on each of the grid points and its corresponding pixel point in the two-dimensional planar image sample.

The way to establish the mapping relationship in the forward direction is opposite to the way to establish the mapping relationship in the reverse direction, which is specifically as follows.

Assume that pixel coordinates of a pixel point in a two-dimensional planar image are ($p_x$, $p_y$). The distortion correction is performed on the pixel point based on the internal parameters of the camera to obtain the distortion-corrected pixel point. The perspective transformation is performed on the distortion-corrected pixel point to obtain an overhead pixel point ($v_x$, $v_y$). The overhead pixel point ($v_x$, $v_y$) is converted into coordinates ($V_x$, $V_y$) in the world coordinate system by a preset conversion coefficient k. The coordinates ($V_x$, $V_y$) is projected in the stereoscopic model to obtain three-dimensional coordinates ($q_x$, $q_y$, $q_z$) of a corresponding grid point in the stereoscopic model. The established mapping relationship includes ($q_x$, $q_y$, $q_z$).

In the way to establish the mapping relationship in the forward direction, a pixel point is mapped to a corresponding grid point, and the number of pixel points is related to the number of grid points included in the mapping relationship. Therefore, the resolution of the mapping relationship is related to the resolution of the two-dimensional planar image. In other words, compared with the way to establish the mapping relationship in the forward direction, the way to establish the mapping relationship in the reverse direction can adjust the resolution of the mapping relationship more conveniently.

S103: for each of grid planes in the preset stereoscopic model, determining a pixel region formed by pixel points to which grid points in the grid plane are mapped as a pixel region corresponding to the grid plane; wherein one grid plane is formed by a first preset number of grid points.

S104: rendering each of the grid planes by the pixel region corresponding to the grid plane to obtain a panoramic image.

The first preset number can be set according to the actual situations, for example, the first preset number are set to three, four, five and so on. Assume that the first preset number is three. It can be understood that three grid points can form a grid plane, and three pixel points in a two-dimensional planar image to which the three grid points are mapped form a pixel region, which corresponds to the grid plane. As such, each of the grid planes corresponds to one pixel region. Each of the grid planes is rendered by the pixel region corresponding to the grid plane, so as to obtain a panoramic image.

As an implementation, a grid plane may be rendered by a pixel region through the GUI (Graphical User Interface) technology. In rendering the grid plane through GUI, some pixel points may be selected in the pixel region and the grid plane may be rendered by the pixel values of these pixel points. The number of the selected pixel points depends on the performance of the device.

In one of the foregoing implementations, the latitudes and longitudes of grid points are used as indexes in the established mapping relationship. In this implementation, S104 may include: taking each of the grid planes as a to-be-rendered plane; determining to-be-rendered positions in the preset stereoscopic model based on three-dimensional coordinates of grid points contained in the to-be-rendered planes; determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

In this implementation, current to-be-mapped grid points may be determined in order of latitudes and longitudes of grid points, and three-dimensional coordinates of the current to-be-mapped grid points and its corresponding pixel coordinates are determined. In this way, three-dimensional coordinates of each of the grid points are obtained. Based on the three-dimensional coordinates, a position of a to-be-rendered plane (a to-be-rendered position) can be determined in the stereoscopic model. In addition, pixel coordinates of a pixel point corresponding to each of grid points are also obtained. One target region can be determined in the two-dimensional planar image based on the pixel coordinates, and the to-be-rendered position is rendered by the target region to obtain the panoramic image.

As an implementation, after S102, the method further includes: marking a grid point that has failed to be mapped as an invalid point. In this implementation, S103 may include: for each valid grid plane in the preset stereoscopic model, determining a pixel region formed by pixel points to which grid points in the valid grid plane are mapped as a pixel region corresponding to the valid grid plane, wherein the valid grid plane is formed by grid points other than the invalid grid point. S104 includes rendering each valid grid plane by the pixel region corresponding to the valid grid plane to obtain a panoramic image.

If the number of grid points in the stereoscopic model is greater than the number of pixel points in the two-dimensional planar image, there will be some grid points that have failed to be mapped. There are no pixel points in the two-dimensional planar image corresponding to the grid points that have failed to be mapped, and thus the grid points that have failed to be mapped cannot be rendered. Therefore, the grid points that have failed to be mapped can be marked as invalid points. A pixel region(s) corresponding to a grid plane(s) including the invalid points is not determined, and the grid plane(s) including the invalid pints is not rendered.

Assume that three-dimensional coordinates of a grid point are $(q_x, q_y, q_z)$, and pixel coordinates of a pixel point corresponding to the grid point are $(p_x, p_y)$. If $p_x > w$ (the latitude interval of the stereoscopic model in FIG. 3), or $p_x < 0$, or $p_y > h$ (the longitude interval of the stereoscopic model in FIG. 3), or $p_y < 0$, the grid point may be marked as an invalid point. Specifically, $q_x, q_y, q_z, p_x, p_y$ may all be set to flage, which is an invalid flag. For example, a feature flag value such as flage=−7 may be set.

The failure of mapping may occur in other situations, which are not listed here.

In the embodiment of FIG. 1, frame images in a video may be acquired in S101. In this case, a dynamic panoramic image video may be generated by applying the embodiment of FIG. 1 to each of the frame images.

In the embodiment shown in FIG. 1 of the present application, pixel points in a two-dimensional planar image to which grid points in a preset stereoscopic model are mapped are determined based on a pre-established mapping relationship. Multiple grid points form one grid plane, and accordingly, multiple pixel points to which the multiple grid points are mapped form one pixel region. A panoramic image is obtained by rendering each of grid planes with the pixel region corresponding to the grid plane. It can be seen that in this solution, it is not necessary to generate a distortion-corrected image and an overhead image, thus saving storage resources.

Figure 4:
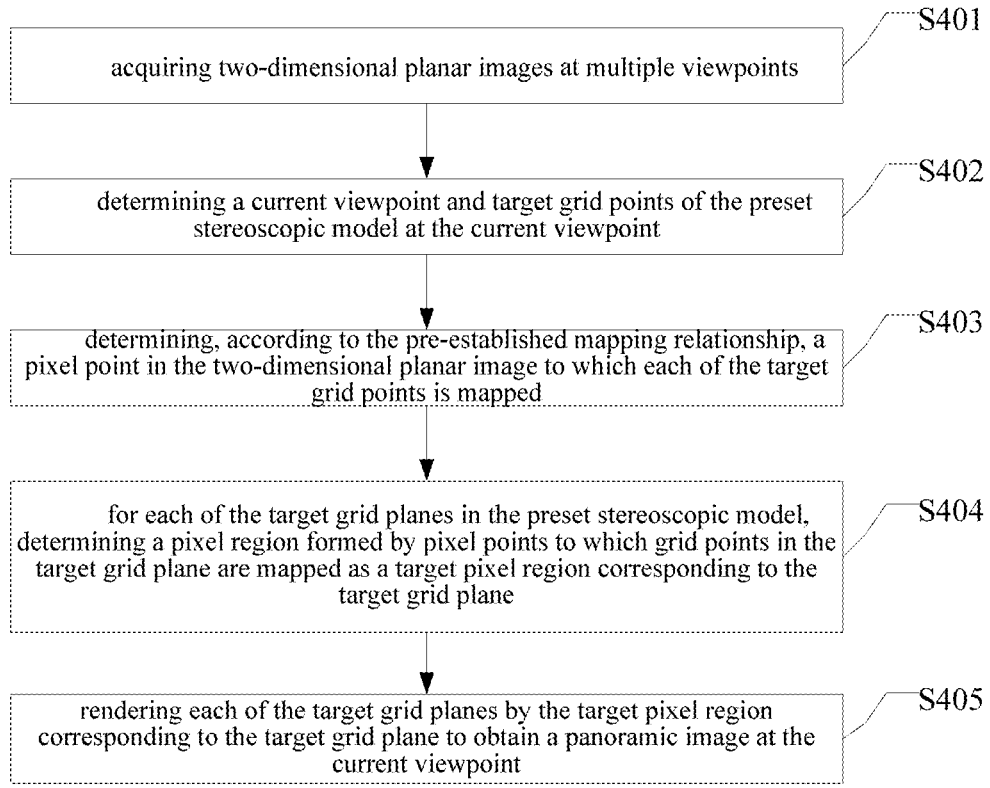
FIG. 4 is a second flowchart of a method for generating a panoramic image according to an embodiment of the present application.

FIG. 4 is a second flowchart of a method for generating a panoramic image according to an embodiment of the present application. The method includes:

S401: acquiring two-dimensional planar images at multiple viewpoints;

S402: determining a current viewpoint and target grid points of a preset stereoscopic model at the current viewpoint;

S403: determining, according to a pre-established mapping relationship, pixel points in the two-dimensional planar image to which the target grid points are mapped;

S404: for each of target grid planes in the preset stereoscopic model, determining a pixel region formed by pixel points to which grid points in the target grid plane are mapped as a target pixel region corresponding to the target grid plane, wherein one target grid plane is formed by a first preset number of target grid points; and S405: rendering each of the target grid planes through the target pixel region corresponding to this target grid plane, to obtain a panoramic image at the current viewpoint.

Still referring to FIG. 2, a 360-degree panoramic image can be obtained by applying the embodiment shown in FIG. 1 to render the partial sphere model in FIG. 2. In some cases, only a panoramic image of a certain viewpoint needs to be obtained. In these cases, only a panoramic image of this viewpoint can be generated. By applying the embodiment shown in FIG. 4, a panoramic image of a certain viewpoint can be generated.

The following description is given in conjunction with an application scenario. In an on-board device, assume that there are four on-board cameras for capturing front, rear, left, and right images of a vehicle, respectively. Four two-dimensional planar images including front, back, left, and right images (at four viewpoints) at the same moment in the same scene are acquired. Assume that the user only needs a rear panoramic image, it is determined that the current viewpoint is a rear viewpoint.

Target grid points of the preset stereoscopic model at the rear viewpoint are determined. In an implementation of the embodiment of FIG. 1, the longitude and latitude intervals of the stereoscopic model are determined. The latitude interval is w=w1+w2+w3+w4−3d, and the longitude interval is h. In this implementation, assuming w1=w2=w3=w4, then wi=(w+3d)/4[[−3d]], i ∈ [1, 4]. According to this formula, a latitude range in the stereoscopic model corresponding to each camera viewpoint can be determined, and grid points in this range are determined as the target grid points.

Alternatively, if N two-dimensional planar images are acquired, then the latitude range in the stereoscopic model corresponding to each camera viewpoint may be determined by wi=[w+(N−1)d]/N[[−(N−1)d]], i∈[1, N].

Only the pixel regions corresponding to the grid planes formed by the target grid points are determined. For convenience of description, the grid planes formed by the target grid points are called the target grid planes, and the pixel regions corresponding to the target grid planes are called the target pixel regions. A panoramic image at the current viewpoint is obtained by rendering the target grid planes through only the target pixel regions.

In the embodiment of FIG. 4, the current viewpoint may be switched according to actual needs. After the viewpoint is switched to a new viewpoint, the embodiment of FIG. 4 may be used to generate a panoramic image of this new viewpoint.

In the embodiment of FIG. 4, two-dimensional planar images at multiple viewpoints obtained in S401 may be images of multiple videos. For example, in the above-mentioned on-board device, the four on-board cameras send videos to the device respectively, and the device receives four videos, and acquires four images at the same time from the four videos respectively. A dynamic panoramic image video may be generated by applying the embodiment of FIG. 4 to these four images. In addition, the current viewpoint may be switched to generate a dynamic, roamable, panoramic image video.

Figure 5:
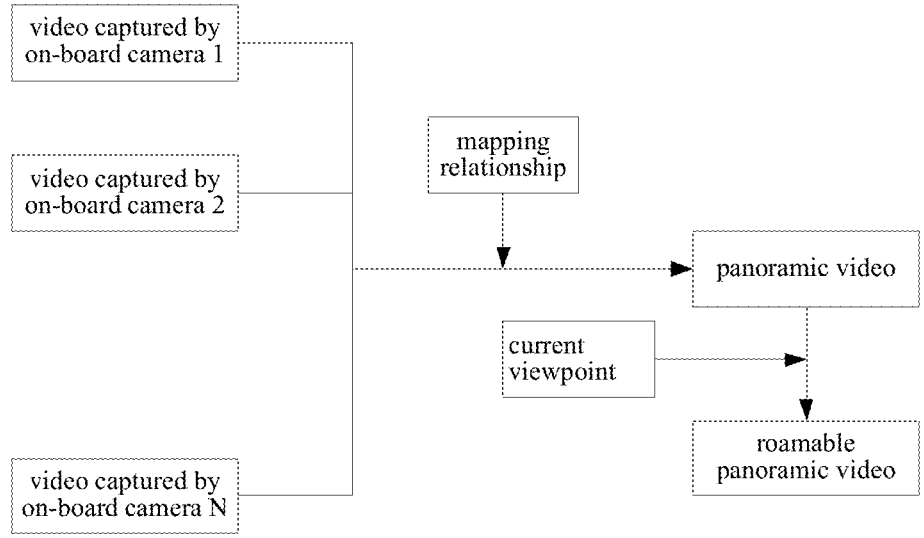
FIG. 5 is a diagram of a framework for generating a panoramic image video that can be roamed according to an embodiment of the present application.

For example, a framework for generating a dynamic, roamable, panoramic image video may be shown in FIG. 5. Multiple on-board cameras (on-board camera 1, on-board camera 2 . . . on-board camera N) send captured videos to the device, and the device may generate a panoramic video according to a pre-established mapping relationship, and may update the viewpoint of the generated panoramic video with a current viewpoint, that is, generate a roamable panoramic video to realize video roaming.

Figure 6:
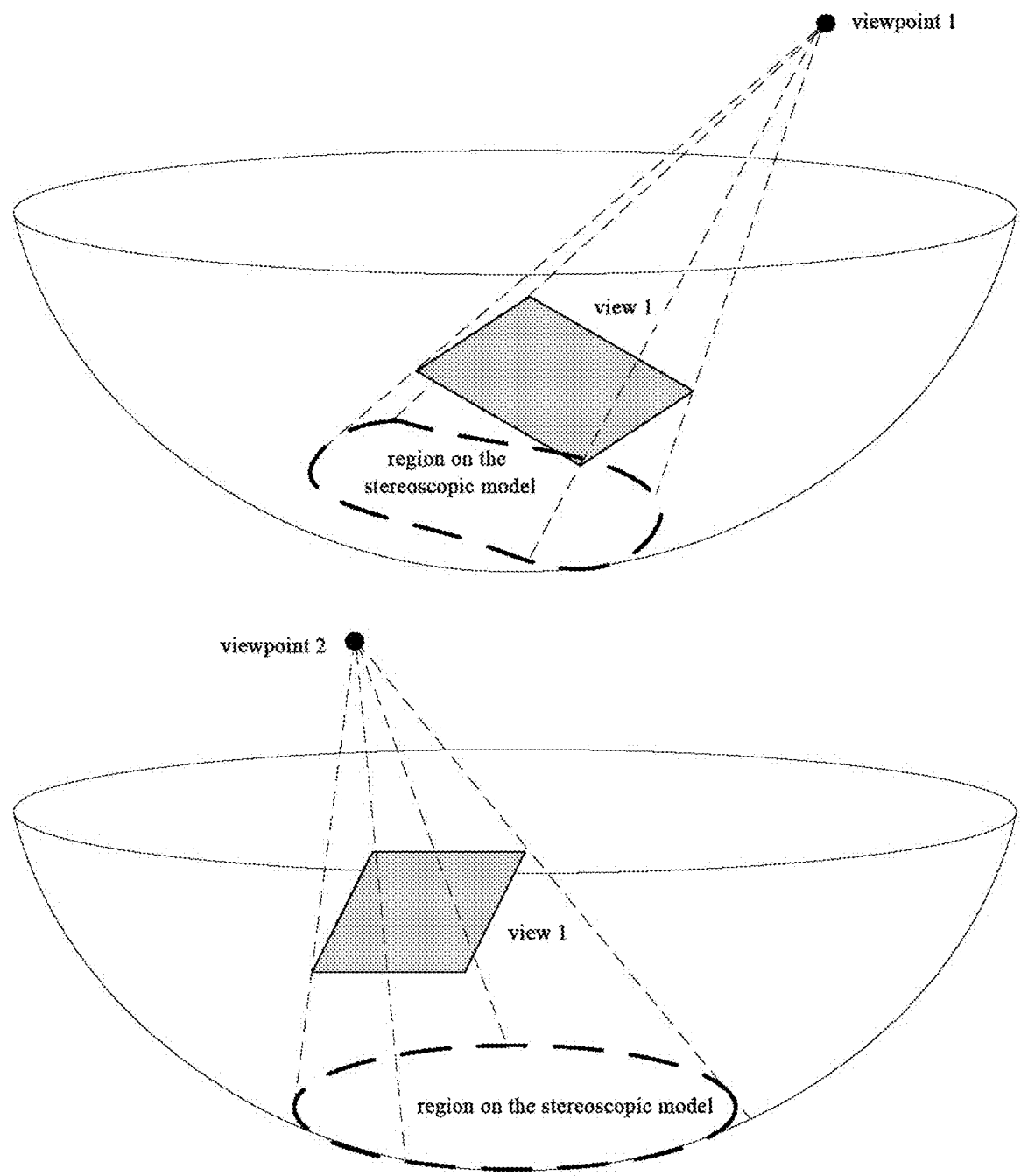
FIG. 6 is a diagram of a panoramic image at a certain viewpoint according to an embodiment of the present application.

As shown in FIG. 6, views 1 and 2 in FIG. 6 can be understood as display areas. If a current viewpoint is viewpoint 1, a dotted area in the stereoscopic model is rendered to obtain a panoramic image at the viewpoint, and the panoramic image is displayed in the view 1. Similarly, if the current viewpoint is viewpoint 2, a dotted area in the stereoscopic model is rendered to obtain a panoramic image at the viewpoint, and the panoramic image is displayed in the view 2.

Alternatively, the two-dimensional planar images at multiple viewpoints in S401 may be multiple images captured by an on-board surround view lens. The specific application scenario is not limited.

By applying the embodiment shown in FIG. 4 of the present application, a panoramic image at a current viewpoint can be generated only for the current viewpoint, which reduce the amount of calculation, compared with the generation of a 360-degree panoramic image. Furthermore, panoramic video roaming can be realized, which results in better experience.

Corresponding to the foregoing method embodiments, an embodiment of the present application further provides an apparatus for generating a panoramic image.

Figure 7:
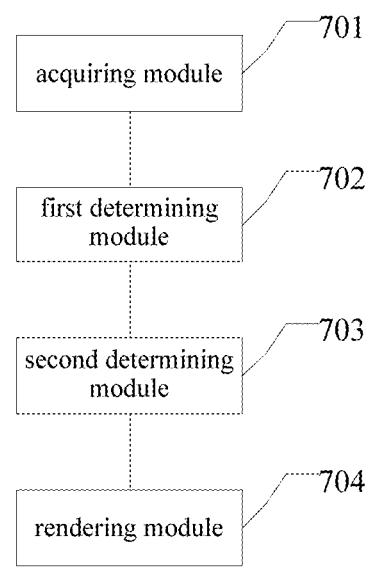
FIG. 7 is a structural diagram of an apparatus for generating a panoramic image according to an embodiment of the present application.

FIG. 7 is a structural diagram of an apparatus for generating a panoramic image according to an embodiment of the present application. The apparatus includes:

an acquiring module 701, configured for acquiring a two-dimensional planar image;

a first determining module 702, configured for determining, according to a pre-established mapping relationship, a pixel point in the two-dimensional planar image to which each of grid points in a preset stereoscopic model is mapped, wherein the mapping relationship includes a corresponding relationship between each of the grid points in the preset stereoscopic model and a pixel point in the two-dimensional planar image;

a second determining module 703, configured for determining, for each of grid planes in the preset stereoscopic model, a pixel region formed by pixel points to which grid points in this grid plane are mapped as a pixel region corresponding to this grid plane, wherein one grid plane is formed by a first preset number of grid points; and a rendering module 704, configured for rendering each of the grid planes by the pixel region corresponding to this grid plane, to obtain a panoramic image.

As an implementation, the apparatus may further include:

a third determining module, configured for determining grid points in the preset stereoscopic model;

a fourth determining module, configured for determining, for each of the determined grid points, a projection line between the grid point and a preset projection point, wherein the projection point is located above an overhead plane of the preset stereoscopic model, and the projection line starts from the projection point and passes through the grid point;

a fifth determining module, configured for determining intersection points of the projection lines and the overhead plane;

a first converting module, configured for converting the intersection points into overhead pixel points;

an inverse transformation module, configured for performing inverse perspective transformation on the overhead pixel points based on external parameters of a camera capturing the two-dimensional planar image, to obtain distortion-corrected pixel points;

an inverse operation module, configured for performing an inverse distortion correction operation on the distortion-corrected pixel points based on internal parameters of the camera to obtain two-dimensional planar pixel points;

a first establishing module, configured for establishing the mapping relationship based on each of the grid points and a two-dimensional planar pixel point corresponding to this grid point.

As an implementation, the first converting module may be further configured for:

converting the intersection points into the overhead pixel points by a preset conversion coefficient.

As an implementation, the third determining module includes:

a dividing sub-module, configured for dividing the preset stereoscopic model by latitude and longitude;

a determining sub-module, configured for determining, based on a divided result, each of the grid points in the model, longitude and latitude values of each of the grid points, and three-dimensional coordinates of each of the grid points in the preset stereoscopic model.

The first establishing module may be further configured for:

for each of the grid points, establishing a mapping relationship between the three-dimensional coordinates of the grid point and pixel coordinates of a two-dimensional planar pixel point corresponding to the grid point by taking the longitude and latitude values of the grid point as an index.

The first determining module may be further configured for:

sequentially determining current to-be-mapped grid points based on the indexes; and for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped.

The rendering module 705 may be further configured for:

taking each of the grid planes as a to-be-rendered plane; determining to-be-rendered positions in the preset stereoscopic model based on three-dimensional coordinates of grid points contained in the to-be-rendered planes; determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

As an implementation, the dividing sub-module may be further configured for:

determining a latitude interval of each of viewpoints for the preset stereoscopic model; calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

As an implementation, the apparatus may further include:

a distortion correction operation module, configured for performing a distortion correction operation on pixel points in a two-dimensional planar image sample based on internal parameters of a camera capturing the two-dimensional planar image, to obtain distortion-corrected pixel points;

a perspective transformation module, configured for performing perspective transformation on the distortion-corrected pixel points based on external parameters of the camera, to obtain overhead pixel points;

a second converting module, configured for converting the overhead pixel points into world coordinate points;

a sixth determining module, configured for determining projection lines between the world coordinate points and a preset projection point of the preset stereoscopic model;

a seventh determining module, configured for determining intersection points of the projection lines and the preset stereoscopic model as grid points; and a second establishing module, configured for establishing the mapping relationship based on each of the grid points and a pixel point in the two-dimensional planar image sample corresponding to this grid point.

As an implementation, the apparatus may further include:

a marking module, configured for marking a grid point that has failed to be mapped as an invalid point.

The second determining module 703 may be further configured for:

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point.

The rendering module 704 may be further configured for:

rendering each of the valid grid planes by the pixel region corresponding to the valid grid plane to obtain the panoramic image.

As an implementation, in the apparatus, the acquiring module 701 may be further configured for acquiring two-dimensional planar images at multiple viewpoints.

The first determining module 702 may be further configured for:

determining a current viewpoint and target grid points of the preset stereoscopic model at the current viewpoint; and determining, according to the pre-established mapping relationship, a pixel point in the two-dimensional planar image to which each of the target grid points is mapped.

The second determining module 703 may be further configured for:

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points.

The rendering module 704 may be further configured for:

rendering each of the target grid planes by the target pixel region corresponding to the target grid plane to obtain a panoramic image at the current viewpoint.

An embodiment of the present application further provides an electronic device including a processor and a memory. The memory stores a computer program. The processor, when executing the program stored in the memory, implements the following steps:

acquiring a two-dimensional planar image;

determining, according to a pre-established mapping relationship, a pixel point in the two-dimensional planar image to which each of grid points in a preset stereoscopic model is mapped, wherein the mapping relationship includes a corresponding relationship between each of the grid points in the preset stereoscopic model and a pixel point in the two-dimensional planar image;

for each of grid planes in the preset stereoscopic model, determining a pixel region formed by pixel points to which grid points in this grid plane are mapped as a pixel region corresponding to this grid plane, wherein one grid plane is formed by a first preset number of grid points; and rendering each of the grid planes by the pixel region corresponding to this grid plane, to obtain a panoramic image.

As an implementation, the processor, when executing the program stored in the memory, further implements the following steps:

determining grid points in the preset stereoscopic model;

for each of the determined grid points, determining a projection line between the grid point and a preset projection point, wherein the projection point is located above an overhead plane of the preset stereoscopic model, and the projection line starts from the projection point and passes through the grid point;

determining intersection points of the projection lines and the overhead plane;

converting the intersection points into overhead pixel points;

performing inverse perspective transformation on the overhead pixel points based on external parameters of a camera capturing the two-dimensional planar image, to obtain distortion-corrected pixel points;

performing an inverse distortion correction operation on the distortion-corrected pixel points based on internal parameters of the camera to obtain two-dimensional planar pixel points; and establishing the mapping relationship based on each of the grid points and a two-dimensional planar pixel point corresponding to this grid point.

As an implementation, the processor, when executing the program stored in the memory, further implements the following step:

converting the intersection points into the overhead pixel points by a preset conversion coefficient.

As an implementation, the processor, when executing the program stored in the memory, further implements the following steps:

dividing the preset stereoscopic model by latitude and longitude;

determining, based on a divided result, each of the grid points in the model, longitude and latitude values of each of the grid points, and three-dimensional coordinates of each of the grid points in the preset stereoscopic model;

for each of the grid points, establishing a mapping relationship between the three-dimensional coordinates of the grid point and pixel coordinates of a two-dimensional planar pixel point corresponding to the grid point by taking the longitude and latitude values of the grid point as an index;

sequentially determining current to-be-mapped grid points based on the indexes;

for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped;

taking each of the grid planes as a to-be-rendered plane;

determining to-be-rendered positions in the preset stereoscopic model based on three-dimensional coordinates of grid points contained in the to-be-rendered planes;

determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

As an implementation, the processor, when executing the program stored in the memory, further implements the following steps:

determining a latitude interval of each of viewpoints for the preset stereoscopic model;

calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

As an implementation, the processor, when executing the program stored in the memory, further implements the following steps:

performing a distortion correction operation on pixel points in a two-dimensional planar image sample based on internal parameters of a camera capturing the two-dimensional planar image, to obtain distortion-corrected pixel points;

performing perspective transformation on the distortion-corrected pixel points based on external parameters of the camera, to obtain overhead pixel points;

converting the overhead pixel points into world coordinate points;

determining projection lines between the world coordinate points and a preset projection point of the preset stereoscopic model;

determining intersection points of the projection lines and the preset stereoscopic model as grid points; and establishing the mapping relationship based on each of the grid points and a pixel point in the two-dimensional planar image sample corresponding to this grid point.

As an implementation, the processor, when executing the program stored in the memory, further implements the following steps:

marking a grid point that has failed to be mapped as an invalid point, after determining, according to the pre-established mapping relationship, the pixel point in the two-dimensional planar image to which each of the grid points in the preset stereoscopic model is mapped;

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point; and rendering each of the valid grid planes by the pixel region corresponding to the valid grid plane to obtain the panoramic image.

As an implementation, the processor, when executing the program stored in the memory, further implements the following steps:

acquiring two-dimensional planar images at multiple viewpoints;

determining a current viewpoint and target grid points of the preset stereoscopic model at the current viewpoint;

determining, according to the pre-established mapping relationship, a pixel point in the two-dimensional planar image to which each of target grid points is mapped;

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points; and rendering each of the target grid planes by the target pixel region corresponding to the target grid plane to obtain a panoramic image at the current viewpoint.

Figure 8:
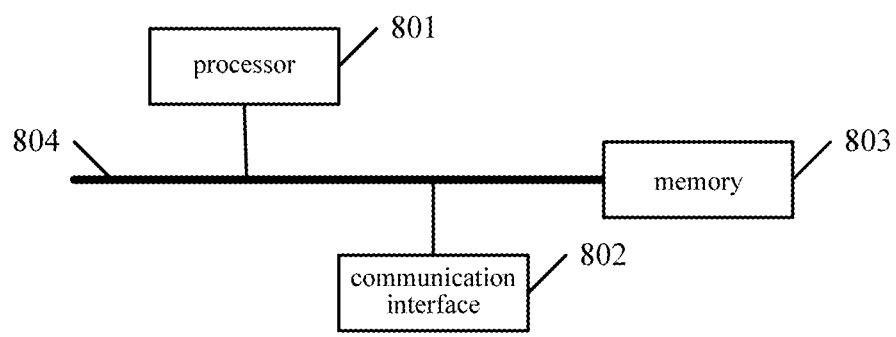
FIG. 8 is a structural diagram of an electronic device according to an embodiment of the present application.

An embodiment of the present application further provides an electronic device. As shown in FIG. 8, the electronic device includes a processor 801, a communication interface 802, a memory 803, and a communication bus 804. The processor 801, the communication interface 802, and the memory 803 communicate with each other through the communication bus 804.

The memory 803 is configured to store a computer program.

The processor 801 is configured to implement any one of the foregoing methods for generating a panoramic image when executing the program stored in the memory 803.

The communication bus mentioned in the above electronic device may be a Peripheral Component Interconnect (PCI) bus, an Extended Industry Standard Architecture (EISA) bus, or the like. The communication bus may be divided into an address bus, a data bus, a control bus, and the like. For convenience of representation, the communication bus is indicated in the figure by a thick line, which does not mean that there is only one bus or one type of bus.

The communication interface is used for communication between the electronic device and other devices.

The memory may include a random access memory (RAM), and may include a non-volatile memory (NVM), such as at least one disk memory. Optionally, the memory may be at least one storage device located away from the foregoing processor.

The processor may be a general-purpose processor, including a Central Processing Unit (CPU), a Network Processor (NP), and the like. It may also be a Digital Signal Processor (DSP), an Application Specific Integrated Circuit (ASIC), a Field-Programmable Gate Array (FPGA), or other programmable logic devices, discrete gate or transistor logic devices, discrete hardware components.

With the embodiment shown in FIG. 8 of the present application, a pixel point in a two-dimensional planar image to which each of grid points in a preset stereoscopic model is mapped is determined according to a pre-established mapping relationship. Multiple grid points form one grid plane, and accordingly, multiple pixel points to which the multiple grid points are mapped form one pixel region. Each of the grid planes is rendered by the pixel region corresponding to the grid plane to obtain a panoramic image. It can be seen that in this solution, it is not necessary to generate a distortion-corrected image and an overhead image, thus saving storage resources.

An embodiment of the present application further provides a computer-readable storage medium. The computer-readable storage medium stores a computer program, and the computer program is executed by a processor, so as to cause the processor to implement the following steps:

acquiring a two-dimensional planar image;

determining, according to a pre-established mapping relationship, a pixel point in the two-dimensional planar image to which each of grid points in a preset stereoscopic model is mapped, wherein the mapping relationship includes a corresponding relationship between each of the grid points in the preset stereoscopic model and a pixel point in the two-dimensional planar image;

for each of grid planes in the preset stereoscopic model, determining a pixel region formed by pixel points to which grid points in this grid plane are mapped as a pixel region corresponding to this grid plane, wherein one grid plane is formed by a first preset number of grid points; and rendering each of the grid planes by the pixel region corresponding to this grid plane, to obtain a panoramic image.

As an implementation, the computer program may be further executed by the processor, so as to cause the processor to implement the following steps:

determining grid points in the preset stereoscopic model;

for each of the determined grid points, determining a projection line between the grid point and a preset projection point, wherein the projection point is located above an overhead plane of the preset stereoscopic model, and the projection line starts from the projection point and passes through the grid point;

determining intersection points of the projection lines and the overhead plane;

converting the intersection points into overhead pixel points;

performing inverse perspective transformation on the overhead pixel points based on external parameters of a camera capturing the two-dimensional planar image, to obtain distortion-corrected pixel points;

performing an inverse distortion correction operation on the distortion-corrected pixel points based on internal parameters of the camera to obtain two-dimensional planar pixel points; and establishing the mapping relationship based on each of the grid points and a two-dimensional planar pixel point corresponding to this grid point.

As an implementation, the computer program may be further executed by the processor, so as to cause the processor to implement the following step:

converting the intersection points into the overhead pixel points by a preset conversion coefficient.

As an implementation, the computer program may be further executed by the processor, so as to cause the processor to implement the following steps:

dividing the preset stereoscopic model by latitude and longitude;

determining, based on a divided result, each of the grid points in the model, longitude and latitude values of each of the grid points, and three-dimensional coordinates of each of the grid points in the preset stereoscopic model;

for each of the grid points, establishing a mapping relationship between the three-dimensional coordinates of the grid point and pixel coordinates of a two-dimensional planar pixel point corresponding to the grid point by taking the longitude and latitude values of the grid point as an index;

sequentially determining current to-be-mapped grid points based on the indexes;

for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped;

taking each of the grid planes as a to-be-rendered plane;

determining to-be-rendered positions in the preset stereoscopic model based on three-dimensional coordinates of grid points contained in the to-be-rendered planes;

determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

As an implementation, the computer program may be further executed by the processor, so as to cause the processor to implement the following steps:

determining a latitude interval of each of viewpoints for the preset stereoscopic model;

calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

As an implementation, the computer program may be further executed by the processor, so as to cause the processor to implement the following steps:

performing a distortion correction operation on pixel points in a two-dimensional planar image sample based on internal parameters of a camera capturing the two-dimensional planar image, to obtain distortion-corrected pixel points;

performing perspective transformation on the distortion-corrected pixel points based on external parameters of the camera, to obtain overhead pixel points;

converting the overhead pixel points into world coordinate points;

determining projection lines between the world coordinate points and a preset projection point of the preset stereoscopic model;

determining intersection points of the projection lines and the preset stereoscopic model as grid points; and establishing the mapping relationship based on each of the grid points and a pixel point in the two-dimensional planar image sample corresponding to this grid point.

As an implementation, the computer program may be further executed by the processor, so as to cause the processor to implement the following steps:

marking a grid point that has failed to be mapped as an invalid point after determining, according to the pre-established mapping relationship, the pixel point in the two-dimensional planar image to which each of the grid points in the preset stereoscopic model is mapped;

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point; and rendering each of the valid grid planes by the pixel region corresponding to the valid grid plane to obtain the panoramic image.

As an implementation, the computer program may be further executed by the processor, so as to cause the processor to implement the following steps:

acquiring two-dimensional planar images at multiple viewpoints;

determining a current viewpoint and target grid points of the preset stereoscopic model at the current viewpoint;

determining, according to the pre-established mapping relationship, a pixel point in the two-dimensional planar image to which each of the target grid points is mapped;

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points; and rendering each of the target grid planes by the target pixel region corresponding to the target grid plane to obtain a panoramic image at the current viewpoint.

An embodiment of the present application further discloses executable program codes which, when executed, implement any of the foregoing methods for generating a panoramic image.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the electronic device, the computer-readable storage medium, and the executable program codes are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for generating a panoramic image, comprising:

acquiring a two-dimensional planar image;

determining, according to a pre-established mapping relationship, a pixel point in the two-dimensional planar image to which each of grid points in a preset stereoscopic model is mapped, wherein the preset stereoscopic model is a partial sphere, wherein the mapping relationship comprises a corresponding relationship between each of the grid points in the preset stereoscopic model and a pixel point in the two-dimensional planar image;

for each of grid planes in the preset stereoscopic model, determining a pixel region formed by pixel points to which grid points in this grid plane are mapped as a pixel region corresponding to this grid plane, wherein one grid plane is formed by a first preset number of grid points; and rendering each of the grid planes by the pixel region corresponding to this grid plane, to obtain a panoramic image, wherein the mapping relationship is established by:

determining grid points in the preset stereoscopic model;

for each of the determined grid points, determining a projection line between the grid point and a preset projection point, wherein the projection point is located above an overhead plane of the preset stereoscopic model, and the projection line starts from the projection point and passes through the grid point;

determining intersection points of the projection lines and the overhead plane;

converting the intersection points into overhead pixel points;

performing inverse perspective transformation on the overhead pixel points based on external parameters of a camera capturing the two-dimensional planar image, to obtain distortion-corrected pixel points;

performing an inverse distortion correction operation on the distortion-corrected pixel points based on internal parameters of the camera to obtain two-dimensional planar pixel points; and establishing the mapping relationship based on each of the grid points and a two-dimensional planar pixel point corresponding to this grid point.

2. The method according to claim 1, wherein the step of converting the intersection points into overhead pixel points comprises:

converting the intersection points into the overhead pixel points by a preset conversion coefficient.

3. The method according to claim 1, wherein the step of determining grid points in the preset stereoscopic model comprises:

dividing the preset stereoscopic model by latitude and longitude; and determining, based on a divided result, each of the grid points in the model, longitude and latitude values of each of the grid points, and three-dimensional coordinates of each of the grid points in the preset stereoscopic model;

the step of establishing the mapping relationship based on each of the grid points and a two-dimensional planar pixel point corresponding to this grid point comprises:

for each of the grid points, establishing a mapping relationship between the three-dimensional coordinates of the grid point and pixel coordinates of a two-dimensional planar pixel point corresponding to the grid point by taking the longitude and latitude values of the grid point as an index;

the step of determining, according to a pre-established mapping relationship, a pixel point in the two-dimensional planar image to which each of grid points in a preset stereoscopic model is mapped comprises:

sequentially determining current to-be-mapped grid points based on indexes in the pre-established mapping relationship;

for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped; and the step of rendering each of the grid planes by the pixel region corresponding to this grid plane, to obtain a panoramic image comprises:

taking each of the grid planes as a to-be-rendered plane;

determining to-be-rendered positions in the preset stereoscopic model based on three-dimensional coordinates of grid points contained in the to-be-rendered planes;

determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

4. The method according to claim 3, wherein the step of dividing the preset stereoscopic model by latitude and longitude comprises:

determining a latitude interval of each of viewpoints for the preset stereoscopic model, wherein each of the viewpoints indicates a position of a camera;

calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

5. The method according to claim 1, wherein the mapping relationship is established by:

performing a distortion correction operation on pixel points in a two-dimensional planar image sample based on internal parameters of a camera capturing the two-dimensional planar image, to obtain distortion-corrected pixel points;

performing perspective transformation on the distortion-corrected pixel points based on external parameters of the camera, to obtain overhead pixel points;

converting the overhead pixel points into world coordinate points;

determining projection lines between the world coordinate points and a preset projection point of the preset stereoscopic model;

determining intersection points of the projection lines and the preset stereoscopic model as grid points; and establishing the mapping relationship based on each of the grid points and a pixel point in the two-dimensional planar image sample corresponding to the each of the grid points.

6. The method according to claim 1, wherein after determining, according to the pre-established mapping relationship, the pixel point in the two-dimensional planar image to which each of the grid points in the preset stereoscopic model is mapped, the method further comprises:

marking a grid point that has failed to be mapped as an invalid point;

the step of, for each of grid planes in the preset stereoscopic model, determining a pixel region formed by pixel points to which grid points in this grid plane are mapped as a pixel region corresponding to this grid plane comprises:

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point; and the step of rendering each of the grid planes by the pixel region corresponding to this grid plane to obtain a panoramic image comprises:

rendering each of the valid grid planes by the pixel region corresponding to the valid grid plane to obtain the panoramic image.

7. The method according to claim 1, wherein the step of acquiring a two-dimensional planar image comprises:

acquiring two-dimensional planar images at multiple viewpoints;

the step of determining, according to a pre-established mapping relationship, a pixel point in the two-dimensional planar image to which each of grid points in a preset stereoscopic model is mapped comprises:

determining a current viewpoint and target grid points of the preset stereoscopic model at the current viewpoint;

determining, according to the pre-established mapping relationship, a pixel point in the two-dimensional planar image to which each of the target grid points is mapped;

the step of, for each of grid planes in the preset stereoscopic model, determining a pixel region formed by pixel points to which grid points in this grid plane are mapped as a pixel region corresponding to this grid plane comprises:

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points;

the step of rendering each of the grid planes by the pixel region corresponding to this grid plane to obtain a panoramic image comprises:

rendering each of the target grid planes by the target pixel region corresponding to the target grid plane to obtain a panoramic image at the current viewpoint.

8. An electronic device, comprising a processor and a memory, wherein the memory stores a computer program, and the processor, when executing the program stored in the memory, performs a method comprising steps of:

acquiring a two-dimensional planar image;

determining, according to a pre-established mapping relationship, a pixel point in the two-dimensional planar image to which each of grid points in a preset stereoscopic model is mapped, wherein the preset stereoscopic model is a partial sphere, wherein the mapping relationship comprises a corresponding relationship between each of the grid points in the preset stereoscopic model and a pixel point in the two-dimensional planar image;

for each of grid planes in the preset stereoscopic model, determining a pixel region formed by pixel points to which grid points in this grid plane are mapped as a pixel region corresponding to this grid plane, wherein one grid plane is formed by a first preset number of grid points; and rendering each of the grid planes by the pixel region corresponding to this grid plane, to obtain a panoramic image, wherein the mapping relationship is established by:

determining grid points in the preset stereoscopic model;

for each of the determined grid points, determining a projection line between the grid point and a preset projection point, wherein the projection point is located above an overhead plane of the preset stereoscopic model, and the projection line starts from the projection point and passes through the grid point;

determining intersection points of the projection lines and the overhead plane;

converting the intersection points into overhead pixel points;

performing inverse perspective transformation on the overhead pixel points based on external parameters of a camera capturing the two-dimensional planar image, to obtain distortion-corrected pixel points;

performing an inverse distortion correction operation on the distortion-corrected pixel points based on internal parameters of the camera to obtain two-dimensional planar pixel points; and establishing the mapping relationship based on each of the grid points and a two-dimensional planar pixel point corresponding to this grid point.

9. The electronic device according to claim 8, wherein the step of converting the intersection points into overhead pixel points comprises:

converting the intersection points into the overhead pixel points by a preset conversion coefficient.

10. The electronic device according to claim 8, wherein the step of determining grid points in the preset stereoscopic model comprises:

dividing the preset stereoscopic model by latitude and longitude; and determining, based on a divided result, each of the grid points in the model, longitude and latitude values of each of the grid points, and three-dimensional coordinates of each of the grid points in the preset stereoscopic model;

the step of establishing the mapping relationship based on each of the grid points and a two-dimensional planar pixel point corresponding to this grid point comprises:

for each of the grid points, establishing a mapping relationship between the three-dimensional coordinates of the grid point and pixel coordinates of a two-dimensional planar pixel point corresponding to the grid point by taking the longitude and latitude values of the grid point as an index;

the step of determining, according to a pre-established mapping relationship, a pixel point in the two-dimensional planar image to which each of grid points in a preset stereoscopic model is mapped comprises:

sequentially determining current to-be-mapped grid points based on indexes in the pre-established mapping relationship;

for each of the current to-be-mapped grid points, determining the three-dimensional coordinates of the current to-be-mapped grid point and pixel coordinates corresponding to the current to-be-mapped grid point, wherein the determined pixel coordinates are coordinates of a pixel point in the two-dimensional planar image to which the current to-be-mapped grid point is mapped; and the step of rendering each of the grid planes by the pixel region corresponding to this grid plane, to obtain a panoramic image comprises:

taking each of the grid planes as a to-be-rendered plane;

determining to-be-rendered positions in the preset stereoscopic model based on three-dimensional coordinates of grid points contained in the to-be-rendered planes;

determining target regions in the two-dimensional planar image based on pixel coordinates corresponding to the three-dimensional coordinates of the grid points contained in the to-be-rendered planes; and rendering the to-be-rendered positions by the target regions to obtain the panoramic image.

11. The electronic device according to claim 10, wherein the step of dividing the preset stereoscopic model by latitude and longitude comprises:

determining a latitude interval of each of viewpoints for the preset stereoscopic model, wherein each of the viewpoints indicates a position of a camera;

calculating the sum of the latitude intervals of the viewpoints;

subtracting an overlapping latitude interval between the viewpoints from the sum to obtain a latitude interval of the preset stereoscopic model;

determining a longitude interval of each of the viewpoints as a longitude interval of the preset stereoscopic model; and dividing the preset stereoscopic model by latitude and longitude based on the longitude interval and the latitude interval of the preset stereoscopic model.

12. The electronic device according to claim 8, wherein the mapping relationship is established by:

performing a distortion correction operation on pixel points in a two-dimensional planar image sample based on internal parameters of a camera capturing the two-dimensional planar image, to obtain distortion-corrected pixel points;

performing perspective transformation on the distortion-corrected pixel points based on external parameters of the camera, to obtain overhead pixel points;

converting the overhead pixel points into world coordinate points;

determining projection lines between the world coordinate points and a preset projection point of the preset stereoscopic model;

determining intersection points of the projection lines and the preset stereoscopic model as grid points; and establishing the mapping relationship based on each of the grid points and a pixel point in the two-dimensional planar image sample corresponding to the each of the grid points.

13. The electronic device according to claim 8, wherein after determining, according to the pre-established mapping relationship, the pixel point in the two-dimensional planar image to which each of grid points in the preset stereoscopic model is mapped, the method further comprises:

marking a grid point that has failed to be mapped as an invalid point;

the step of, for each of grid planes in the preset stereoscopic model, determining a pixel region formed by pixel points to which grid points in this grid plane are mapped as a pixel region corresponding to this grid plane comprises:

for each of valid grid planes in the preset stereoscopic model, determining a pixel region formed by pixel points to which grid points in the valid grid plane are mapped as a pixel region corresponding to the valid grid plane, the valid grid plane being formed by grid points other than the invalid grid point; and the step of rendering each of the grid planes by the pixel region corresponding to this grid plane to obtain a panoramic image comprises:

rendering each of the valid grid planes by the pixel region corresponding to the valid grid plane to obtain the panoramic image.

14. The electronic device according to claim 8, wherein the step of acquiring a two two-dimensional planar image comprises:

acquiring two-dimensional planar images at multiple viewpoints;

the step of determining, according to a pre-established mapping relationship, a pixel point in the two-dimensional planar image to which each of grid points in a preset stereoscopic model is mapped comprises:

determining a current viewpoint and target grid points of the preset stereoscopic model at the current viewpoint; and determining, according to the pre-established mapping relationship, a pixel point in the two-dimensional planar image to which each of target grid points is mapped;

the step of, for each of grid planes in the preset stereoscopic model, determining a pixel region formed by pixel points to which grid points in this grid plane are mapped as a pixel region corresponding to this grid plane comprises:

for each of the target grid planes in the preset stereoscopic model, determining a pixel region formed by pixel points to which grid points in the target grid plane are mapped as a target pixel region corresponding to the target grid plane, wherein one target grid plane is formed by the first preset number of target grid points;

the step of rendering each of the grid planes by the pixel region corresponding to this grid plane to obtain a panoramic image comprises:

rendering each of the target grid planes by the target pixel region corresponding to the target grid plane to obtain a panoramic image at the current viewpoint.

15. A non-transitory computer-readable storage medium, wherein the computer-readable storage medium stores a computer program which is executed by a processor, so as to cause the processor to perform the method according to claim 1.

* * * * *